US012639739B2

(12) United States Patent
Oh et al.

(10) Patent No.: US 12,639,739 B2
(45) Date of Patent: May 26, 2026

(54) COMPUTER-IMPLEMENTED METHOD, NON-TRANSITORY COMPUTER READABLE STORAGE MEDIUM, AND SYSTEM FOR ENHANCING LISTINGS IN AN E-COMMERCE SITE

(71) Applicant: Mercari, Inc., Palo Alto, CA (US)

(72) Inventors: Byong Mok Oh, Los Altos, CA (US); Hayato Ryuki, Irvine, CA (US); Ajay Daptardar, Belmont, MA (US); Thea Lee, Campbell, CA (US); Colin Smith, Aubrey, TX (US)

(73) Assignee: MERCARI, INC., Palo Alto, CA (US)

( * ) Notice: Subject to any disclaimer, the term of this patent is extended or adjusted under 35 U.S.C. 154(b) by 549 days.

(21) Appl. No.: 17/936,176

(22) Filed: Sep. 28, 2022

(65) Prior Publication Data

US 2024/0104626 A1    Mar. 28, 2024

(51) Int. Cl.
*G06Q 30/0601*        (2023.01)

(52) U.S. Cl.
CPC ................................ *G06Q 30/0631* (2013.01)

(58) Field of Classification Search
CPC .................................................. G06Q 30/0631
See application file for complete search history.

(56) References Cited

U.S. PATENT DOCUMENTS

| | | | | |
|---|---|---|---|---|
| 11,580,589 | B2 * | 2/2023 | Dagan | G06F 16/9535 |
| 2020/0380584 | A1 * | 12/2020 | Mozzami | G06Q 30/0633 |

| | | | | |
|---|---|---|---|---|
| 2021/0065269 | A1 * | 3/2021 | Kumazawa | G06V 10/245 |
| 2022/0374805 | A1 * | 11/2022 | Zhang | G06N 20/00 |
| 2023/0385887 | A1 * | 11/2023 | Fuchs | G06F 40/174 |
| 2023/0394549 | A1 * | 12/2023 | Li | G06Q 30/0631 |

OTHER PUBLICATIONS

SellHound App Launches to Deliver One-Tap Selling on Popular Secondhand Marketplaces: New App Uses Artificial Intelligence to Help You Sell Your Stuff on eBay Like a Pro. PR Newswire [New York] Jul. 31, 2019. Retrieved via Dialog. (Year: 2019).*

Rasha Kashef, Hubert Pun. Predicting I-CrossSold products using connected components: A clustering-based recommendation system. Electronic Commerce Research and Applications, vol. 53, 2022 (Year: 2022).*

* cited by examiner

*Primary Examiner* — Michael Misiaszek
(74) *Attorney, Agent, or Firm* — Sterne, Kessler, Goldstein & Fox P.L.L.C.

(57)        ABSTRACT

Embodiments described herein include modeling of seller profiles and behaviors on an e-commerce site to induce more listings and sales within the e-commerce site. For every seller and potential seller on the e-commerce site, their behaviors is to be understood and modeled in order to draw out more listings and completed sales per seller. An example embodiment of the present disclosure includes receiving a first information listing. At least one classification of the information listing may be generated performing at least one machine-learning (ML) process based at least in part on at least one ML model and the first information listing. A recommendation based on the classification of the first information listing may be generated. The recommendation may be recommending. A second information listing may be created.

20 Claims, 7 Drawing Sheets

400

Seller lists an item — 410

Generate a recommendation based on previous listing — 420

Recommend recommendation to seller — 430

Seller modifies previous listing and/or creates new listing based on recommendation — 440

100

300

310 — Find events that act as latent sales, each latent sale associated with a weight 320 — Model latent sales 330 — Resample data 340 — Compare standards with gridsearch 350 — Define weights as important features of model

COMPUTER-IMPLEMENTED METHOD, NON-TRANSITORY COMPUTER READABLE STORAGE MEDIUM, AND SYSTEM FOR ENHANCING LISTINGS IN AN E-COMMERCE SITE

TECHNICAL FIELD

This disclosure is generally directed to modeling of seller profiles and behavior on an e-commerce site to induce more listings and sales within the e-commerce site.

BACKGROUND

A number of e-commerce sites, also known as online marketplaces, exist where users can sell their items. Conventionally, in order to sell on these sites, users must manually create listings for offering their items for sale. The quality of such listings can vary greatly, and may depend on a number of factors, such as the user's experience creating listings, the information the user has on the item (such as make, model, brand, size, color, features, etc.), the user's photo taking skills, whether the user is rushed when creating the listing, whether this is the first time the user has ever tried to sell an item of this type, etc. Since a well-constructed listing will increase the likelihood that the associated item will sell, it would be advantageous if computer technology could be employed to enhance and standardize the quality of listings.

When selling a given item via the e-commerce site, a user of the e-commerce site who wishes to sell the item may have difficulty attracting potential buyers while the item is listed for sale. For example, such difficulties may arise from a user's inexperience with selling in general, or with selling items like the item for sale, giving rise to unreasonable expectations of how much money will result from a sale and how much time will be needed between listing and closing. Separately, the user's difficulties may arise from unfamiliarity with the platform of the e-commerce site itself. Possibly on top of these factors, the user may unwittingly misidentify the object for sale.

As a result of these problems, sales may ultimately be slow or may not close in a necessary time frame. Any number of these problems may have a compounding effect, resulting in the user's frustration, which may in turn lead to the user overcompensating with price reductions, potentially leading to further frustration. Over time, such users may disengage or defect from the platform, resulting in fewer listings for the platform and reduced interest in the platform from other users who would be potential buyers of items listed for sale on the platform.

SUMMARY

Provided herein are system, apparatus, article of manufacture, method and/or computer program product embodiments, and/or combinations and sub-combinations thereof, for modeling of seller profiles and behavior on an e-commerce site to induce more listings and sales within the e-commerce site.

An example embodiment of the present disclosure includes receiving, via at least one computer processor, a first information listing. At least one classification of the information listing may be generated, via the at least one computer processor performing at least one machine-learning (ML) process based at least in part on at least one ML model and the first information listing. A recommendation based on the classification of the first information listing may be generated, via the at least one computer processor. The recommendation may be recommending, via the at least one computer processor. A second information listing may be created.

In some embodiments, the at least one classification may include a brand or a category. The second information listing may be complementary to the first information listing based on the recommendation. The recommendation may occur in a predetermined amount of time. The recommendation may include outputs of the ML model. The outputs of the ML model may include predictive features, where the predictive features include may at least one of a lifetime value, a churn score, or communication. The outputs of the ML model may include factual features, where the factual features may include at least one of total gross merchandise value (GMV), days since last purchase, or days since last listing.

An example embodiment of the present disclosure includes a non-transitory computer readable storage medium storing instructions that, when executed by at least one computer processor, cause the at least one computer processor to perform operations. The operations include receiving a first information listing and generating at least one classification of the first information listing by performing at least one machine-learning (ML) process based at least in part on at least one ML model and the first information listing. The operations further include generating a recommendation based on the classification of the first information listing, recommending the recommendation, and generating a second information listing.

An example embodiment of the present disclosure includes a system including a memory and at least one computer processor coupled to the memory. The at least one computer processor is configured to perform operations including receiving a first information listing and generating at least one classification of the first information listing by performing at least one machine-learning (ML) process based at least in part on at least one ML model and the first information listing. The operations further include generating a recommendation based on the classification of the first information listing, recommending the recommendation, and generating a second information listing.

BRIEF DESCRIPTION OF THE FIGURES

The accompanying drawings are incorporated herein and form a part of the specification, illustrate the present disclosure and, together with the description, further serve to explain the principles of the disclosure and enable a person of skill in the relevant art(s) to make and use the disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for modeling of seller profiles and behavior on an e-commerce site to induce more listings and sales within the e-commerce site.

According to some embodiments, for every seller and potential seller on the e-commerce site, the behavior of the seller should be understood and modelled. The seller's value to the business should be understood, as well as other similar users in order to influence them and draw out more listings and secondary listing recommendations, which could spur the seller or user into listing another item. The user throughout this disclosure may be the seller or the buyer.

According to some embodiments, a seller modeling technology would allow prediction of what sellers do next. This seller modeling technology signals may be embedded into the e-commerce site through customer relationship management (CRM) or suggestions, for example, in a search box or a listing box.

Certain technology outputs may be leveraged to create signals in a product, which may nudge a user or seller to list more items or sell more items efficiently. For example, the e-commerce site would like to increase the listing count for a seller by suggesting what to list next after they have already listed an item. The goal is to suggest complementary items that may potentially sell well together with the item that they have already listed. Complementary items may refer to items that are similar in nature, for example by brand or category. The seller may already own the complementary item, but did not think to list it and the recommendation prods the seller to list an additional item. This suggestion, or recommendation, may lead to an increase in the amount of listings and sales in the e-commerce site, which is advantageous to both the seller and the future buyer.

"For sale objects" (FSO) may be any item, product, object, article, thing, piece, component, sub-component, combination, merchandise, inventory, and/or service that a user wishes to sell via an e-commerce site. When selling items on the e-commerce site, the user is sometimes called a "seller." When buying items on the e-commerce site, the user is sometimes called a "buyer." It is noted that a given user can be, at different times, a buyer, a seller, or simultaneously a buyer and a seller.

Figure 1:
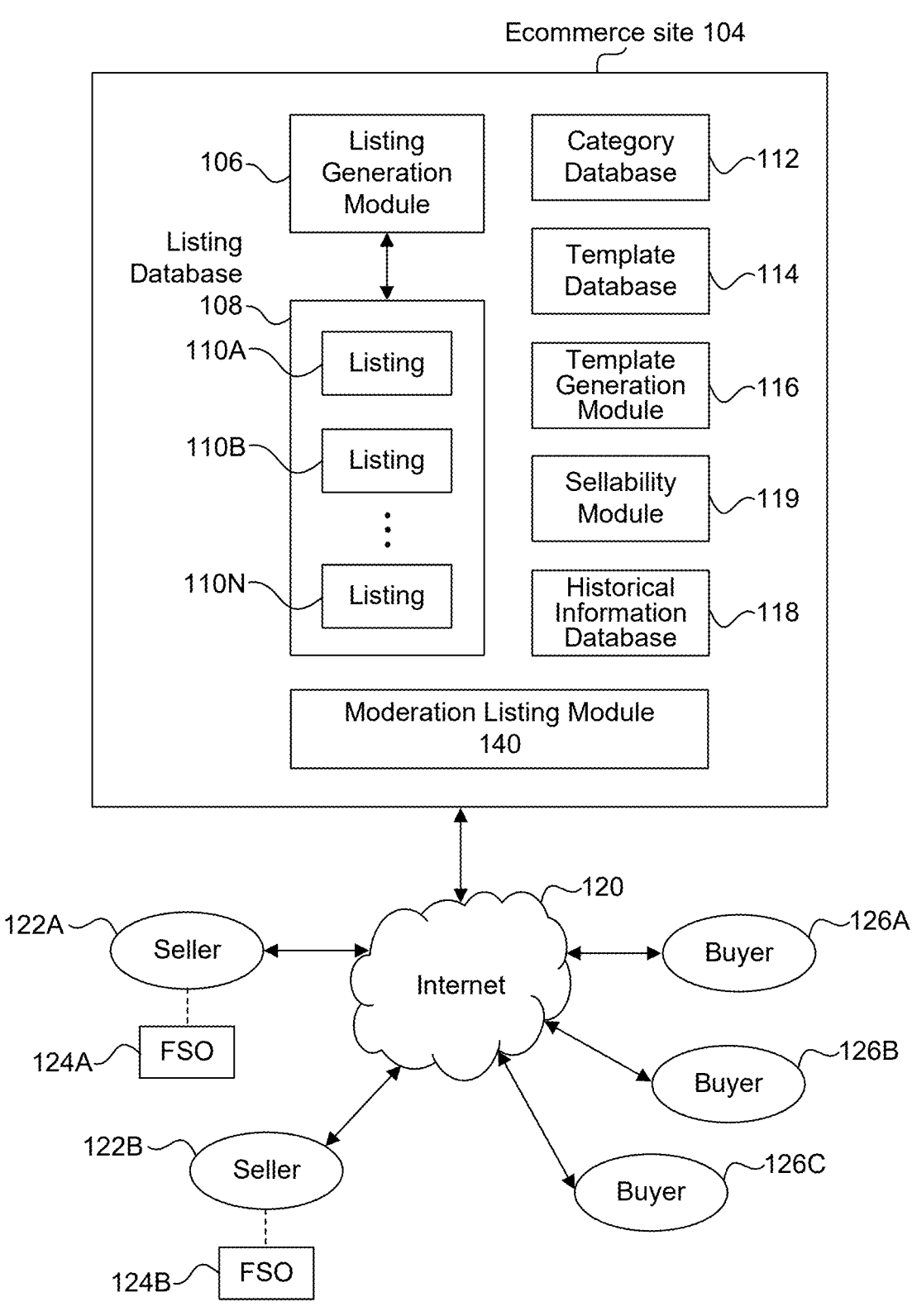
FIG. 1 illustrates a block diagram of a computing environment that includes an e-commerce site where users can buy and sell items and services, where such items/services are called herein "for sale objects" (FSO), according to some embodiments.

FIG. 1 illustrates a block diagram of a computing environment 100 that includes an e-commerce site 104, also referred to as an e-commerce site, where sellers 122 may sell their FSOs 124, and buyers 126 may buy the FSOs 124. The sellers 122 and buyers 126 can access the e-commerce site 104 via the Internet 120.

The e-commerce site 104 may include a listing database 108 that stores a plurality of listings 110. The listings 110 may be created by sellers 122 to sell their respective FSOs 124 on the e-commerce site 104. To do so, the sellers 122 may interact with a listing generation module 106, which enables sellers 122 to create more consistent, higher quality listings in an automated manner, irrespective of the knowledge, skill or experience of the sellers 122.

The listing generation module 106 may operate with templates that are stored in a template database 114. The templates may be generated and updated by a template generation module 116.

The FSOs 124 may each be associated with a category, such as smartphone, laptop computer, garden tool, men's belt, motorcycle, office desk, woman's purse, and comic books, to name just some examples. These categories are stored in a category database 112.

Each of the listings 110 may have a sellability score that was generated by a sellability module 119. Sellability score is a measure of how likely a given FSO 124 will sell on the e-commerce site 104. For example, the sellability score for a given FSO 124 may be a number between 0 and 1, with the number indicating how likely the FSO 124 will sell on the e-commerce site 104 within a given period of time.

Information that the sellability module 119 may use in generating the sellability score for a given FSO 124 can include information associated with the images in the associated listing 110, such as but not limited to the number of image(s), the quality of the image(s), etc.

Other information that the sellability module 119 may use in generating the sellability score can include a price associated with the FSO 124 (that is, the price that the FSO 124 is being offered for sale). For example, the sellability module 119 may compare the price to the Manufacturer's Suggested Retail Price (MSRP) of items similar to the FSO 124 in determining sellability score. Additional information that the sellability module 119 may use in generating the sellability score can include description information in the listing 110 associated with the FSO 124.

Other information that the sellability module 119 may use in generating the sellability score can include the features associated with the FSO 124. Example features may include, but are not limited to, category, brand, make, model, manufacturer, configuration, customization, color, serial number, condition indicators (e.g., poor, used, like new, new), geographic location, etc.

The sellability module 119 may also consider other information when generating the sellability score for a FSO 124, such as (but not limited to) information associated with the seller 122 of the FSO 124.

The e-commerce site 104 may include a historical information database 118. The historical information database 118 may store information pertaining to listings 110 that sold or did not sell, listings 110 that sold for the highest prices, listings 110 that sold in the shortest amounts of time, listings with the highest sellability scores (as determined by the sellability module 119), the original price and the sale price, descriptions of the associated FSOs 124 (such as make, model, brand, size, color, manufacturer, damage, year, etc.), the number of views of each listing 110, the number and amount of offers for each listing 110, as well as any other information included in the original listings 110 or tracked and collected by the e-commerce site 104 while the listings 110 were active (that is, prior to selling or cancellation) on the e-commerce site 104.

Additionally, the sellability module may be used for modelling seller profiles and behaviors and will be further described herein.

Figure 2:
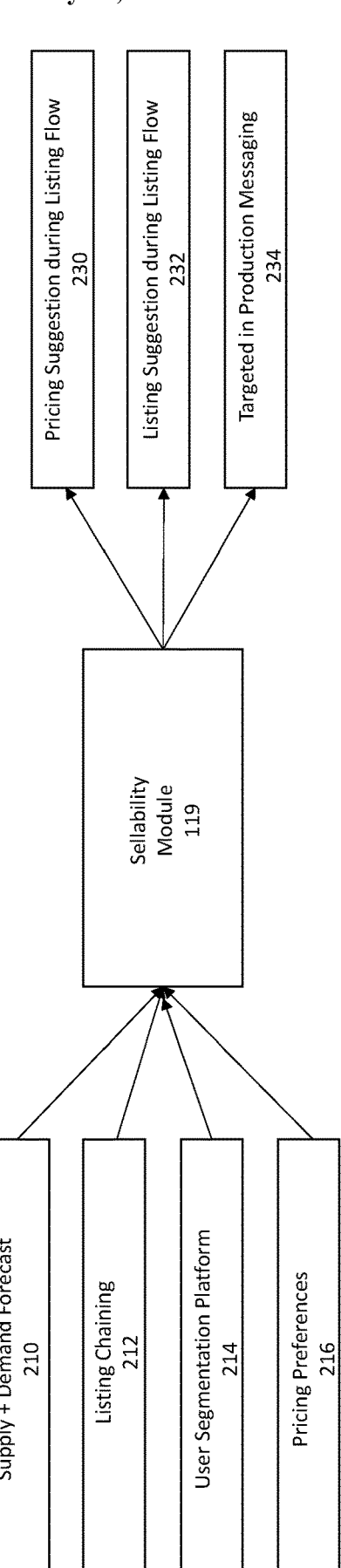
FIG. 2 illustrates a diagram of the architecture of the platform for modelling seller profiles and behaviors, according to some embodiments.

FIG. 2 illustrates a diagram 200 of the architecture of the platform for modelling seller profiles and behaviors using the sellability module 119, according to some embodiments.

In FIG. 2, the technologies such as supply and demand forecast 210, listing chaining 212, user segmentation platform (USP) 214, and pricing preferences 216 are used. These technologies may be input into the sellability module 119. From the sellability module 119, the outcomes may include pricing suggestions during the listing flow 230, a listing suggestion during the listing flow 232, or targeted in production messaging 234. These outcomes may increase listings and/or sales of the e-commerce site.

Several technologies 210-216 may be identified regarding casual or non-sellers' mindsets and behaviors. The technologies will now be described in further detail herein. Although exemplary technologies 210-216 and flows 230-234 are described, the embodiments of this disclosure are not limited to these examples and other technologies and flows can also be used.

Supply and Demand Forecast 210

A user often assumes their estimation of an item's value is consistent with any other user's valuation. If a user deems an item in their possession to have little to no value, the user expects that others feel the same, and, as a result, do not attempt to sell the item. However, there is usually a buyer for nearly any useable item in a range of conditions that the seller may list the item. This idea is often referred to as the supply and demand forecast 210.

To better understand listing and selling activities of users and to make corresponding business programs for campaigns in CRM, for example, a time series prediction system based on historical users data to predict listing behavior (i.e., supply) and shopping behavior (i.e., demand) within at least 30 days in advance, scaled to brand was developed. Based on the time series prediction system results, the relationship between supply and demand may be understood and how it may, for example, change with seasonality.

When a prediction of selling an item includes, for example, a certain brand and/or category, and the supply is less than the demand, a listing of the item may be encouraged with more targeting and efficiency.

However, when the prediction shows supply is more than demand, promotion recommendations may adopt these results for selling with more confidence, which would naturally increase the gross merchandise value (GMV). Additionally, the prediction for average of value (AOV) and sell through rate (STR) may be implemented along with estimating the price and the predicted selling speed.

The result and forecasting for the extract, transform, load (ETL) production code may be customized for various products and business goals.

According to some embodiments, included in the supply and demand forecast 210 is granularity, supply, and demand. In some examples, the granularity refers to the top 1000 brands and level two categories by GMW within the e-commerce site. Listings may be separated into categories. For example, a listing for a cell phone charger may start at a level zero category of "Electronics." The level one of the listing of the cell phone charger may have the category of "Cell Phones." Finally, the level two of the listing of the cell phone charger may have the category of "Cell Phone Accessories."

However, the granularity can include other top numbers of brands. Supply is the total number of unsold and available items as of a given date. Demand refers to the actual sales and latent sales. Specifically, some lost sales may be due to lack of inventory, pricing, or the item not appearing in the search. Latent sales are events that are proxies for lost sales, such as like, view, search, or add to cart (i.e., the item not actually bought).

Certain weights of the events, such as like, view, search, or add to cart, may be used to measure a successful sale. A model is first developed on data between at least twelve events and item status. According to some embodiments, at least twelve events may be necessary to predict future behaviors. For example, zero events will not predict what type of seller it is because no data exists. With a minimum of twelve events, it may be estimated which type of seller it is. However, more than twelve events may be used. With this model, a better understanding of how likely it is to have a successful sale and how to derive demand from the events has been developed. The embodiments of this disclosure are not limited to these number of events and other number of events and item status can be used.

Figure 3:
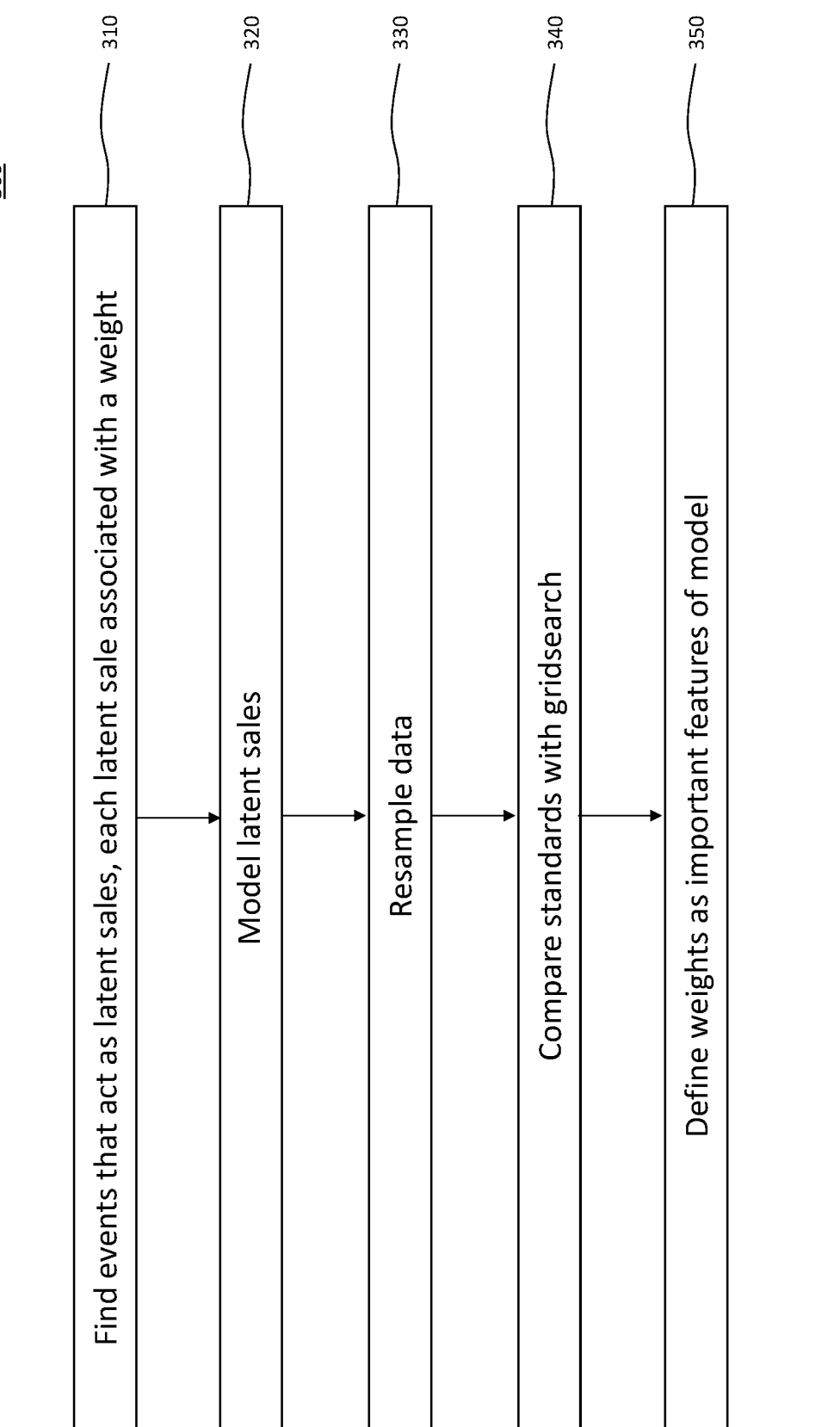
FIG. 3 illustrates a method of measuring weights of events for successful sales, according to some embodiments.

FIG. 3 illustrates a method 300 of measuring weights of events for successful sales, according to some embodiments. As a convenience and not a limitation, FIG. 3 may be described with regard to elements of FIGS. 1-2. Method 300 may represent the operation of measuring weights of events for successful sales, which implements the sellability module 119. Method 300 may also be performed by computer system 700 of FIG. 7. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

In 310, the events in double log may act as latent sales. Each latent sale may be a partial sale with a weight that may quantify its strength. The double log may be a part of the sellability module 119.

In 320, the latent sales may be modeled. For example, a classifier may classify the latent sales to sales (i.e., sold/unsold). The classifier may be a part of the sellability module 119.

In 330, the data may be resampled allowing the model to deal with extreme class imbalance. The resampling may be a part of the sellability module.

In 340, standard classifiers may be compared by using a grid search. The best results were achieved using a random decision forest, a part of the ML model. A random decision forest is an ensemble learning method for classification, for example, that may operate by construction a multitude of decision trees during training. The standard classifiers may be a part of the sellability module.

In 350, the weights may be defined within the model as important features, according to some embodiments. The features may be used later in the ML model, a part of the sellability module.

Listing Chaining 212

Often casual and/or infrequent sellers do not have an awareness of the related items that they could group for a sale. A user is often limited to their own perspective of the use of any given item and cannot therefore, anticipate the combination of other items that may be of interest to potential buyers. This allows for the e-commerce site to suggest similar items to list in succession.

The e-commerce site may suggest to a seller what to list after they have listed an item. This tactic may increase the listing count for the seller. Here, the e-commerce site can suggest complementary items that may potentially sell well together with the item that has already been listed. This will increase the total number of listings on the e-commerce site in general.

After a seller has listed an item, the backend of the e-commerce site waits for a predetermined amount of time (e.g., V0, the first iteration, is equal to 30 minutes, V1, the next iteration, is instant). The backend then sends a push notification to the seller to suggest listing at least one item, or multiple, from specific combinations, such as a specific brand or category, that are complementary to their existing listing. When the seller clicks on the notification, they are redirected to a search page with results filtered, for example on the recommended brand category, or only category combination.

Figure 4:
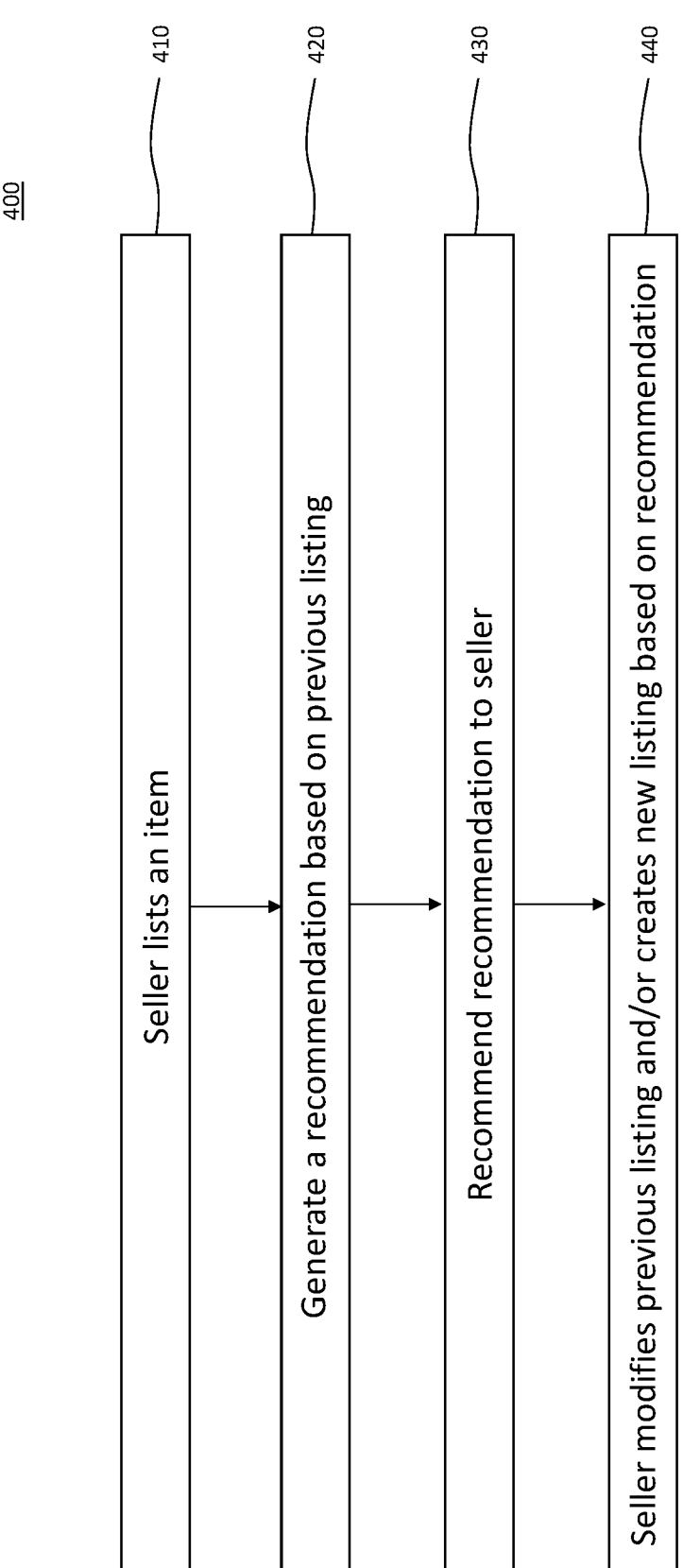
FIG. 4 illustrates a method of offering targeted listing recommendations, according to some embodiments.

This may help sellers sell more items while additionally increasing the per-seller listing counts by offering targeted listing combinations within the e-commerce site. FIG. 4 describes the process of offering a targeted listing further.

FIG. 4 illustrates a method 400 of offering targeted listing recommendations, according to some embodiments. As a convenience and not a limitation, FIG. 4 may be described with regard to elements of FIGS. 1-2. Method 400 may represent the operation of offering target listing recommendations implementing the ML model, which is a part of the sellability module 119. Method 400 may also be performed by computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

In 410, a seller 122A may list an item 124A in the e-commerce site 104. After the listing 110A is complete, a completion event triggers a request to fetch a generated recommendation. Specifically, the seller 122A may list, for example, a pair of basketball shoes in the e-commerce site 104 as a new listing 110A.

In 420, a recommendation based on a previous listing, here 110A, may be generated using a machine learning (ML) model, which is located within the sellability module 119. The recommendation is based on what the seller 122A has already listed, specifically, its brand or category, which may be found, for example in the category database 112. The ML model generates predictive features, which may be used in the recommendation to the seller.

According to some embodiments, the recommendation is recommended to the seller 122A within a short amount of time. This allows the seller 122A to leverage their momentum in selling as being early is important to gain traction with the listings. The recommendation may be based on how all e-commerce site 104 buyers assemble types of items in their cart checkouts, for example.

The recommendation may include brand or category or multiple combinations thereof and may be complementary to the listing that seller has already listed. New sellers to the e-commerce site 104 have a higher possibility of possessing diverse items instead of duplicative quantities of the same type of item, which may generate more listings. Specifically, for the basketball shoe example, the recommendation may include another brand of basketball shoe or another model of the basketball shoe from the same brand that was already listed.

If the specific brand or category or combination thereof is not supported by the e-commerce site 104, the push notification request may be rejected. The ML model outputs may be statically cached in an online cloud database, for example, for faster reading. Additionally, the ML model computations may be ran asynchronously and perform updates to the table cache. The ML model may be reran as a daily or any similar repeated interval. The serving component, also referred to as a microservice, may exist as an internal add-on feature, allowing for ease of long term maintainability.

In 430, the recommendation generated by the ML model is recommended to the seller. Specifically, the recommendation of a different brand basketball shoe may be suggested to the seller 122A. The recommendation may sent to the seller via email, within the e-commerce site app, SMS, or push notification.

In 440, the seller modifies their previous listing 110A and/or creates a new listing 110B, where the modification or the new listing is for the complimentary item and is based on the generated recommendation. Either option is acceptable as the number of items listing has increased within the e-commerce site 104, according to some embodiments. Specifically, the seller 122A may edit their listing to include the basketball shoe brand originally listed and the different brand basketball shoe. Or the seller 122A may add a new listing of the different brand basketball shoe.

In some embodiments, method 400 supports online access to item recommendation, which may include brand or category data from the category database 112, with a sub 50 ms response time of the service. Additionally, it allows real-time updates to the backend data store. In some examples, for cloud based applications, the response time of a service can include the time the cloud based application takes to respond to submitted data.

User Segmentation Platform (USP) 214

According to some embodiments, an e-commerce site wants to understand its user base. In order to understand the users better, definitions of user segments may be broadly understood. The user segments may be a specific cohort of users that may be grouped together for specific reasons. For example, one user segment may include users that may be considered high fraudulent users. Another user segment may be, for example, affluent mothers. Additionally, a CRM team within the e-commerce site may be using different segmentation framework than a team developing the ML model. Lack of a common language to describe users may pose potential technical and organization problems.

Therefore, a centralized platform that may leverage segmentation needs of users is used. The USP 214 allows end-users to create and manage collections of user segments. In some embodiments, the main component of the USP 214 is the features store.

According to some embodiments, three kinds of features may exist within the features store: factual, segment, and predictive, which will now be described herein.

Factual features are facts. These facts may include, for example, total GMV sold, days since a buyer's last purchase, days since a seller's last listing, or the like.

Segment features map users to segment identifiers (IDs) and may indicate the strength of the user's membership.

Predictive features are outputs of the ML model, as described in FIG. 4. The outputs of the ML model may include, but are not limited to, churn scores, lifetime value (LTV), and communication. The churn score refers to the next purchase or the second purchase of the user. Communication refers to the open rate by time of day using a specific type of communication, such as email, within the e-commerce site app, SMS, or push notification. The communication output may also have a frequency band aspect, such as low, medium, or high. The communication output may also have a time of day associated with it, such as morning, noon, afternoon, evening, or night. The predictive features may offer a unique insight which may increase the conversion rate and the LTV of the users within the e-commerce site.

Figure 5:
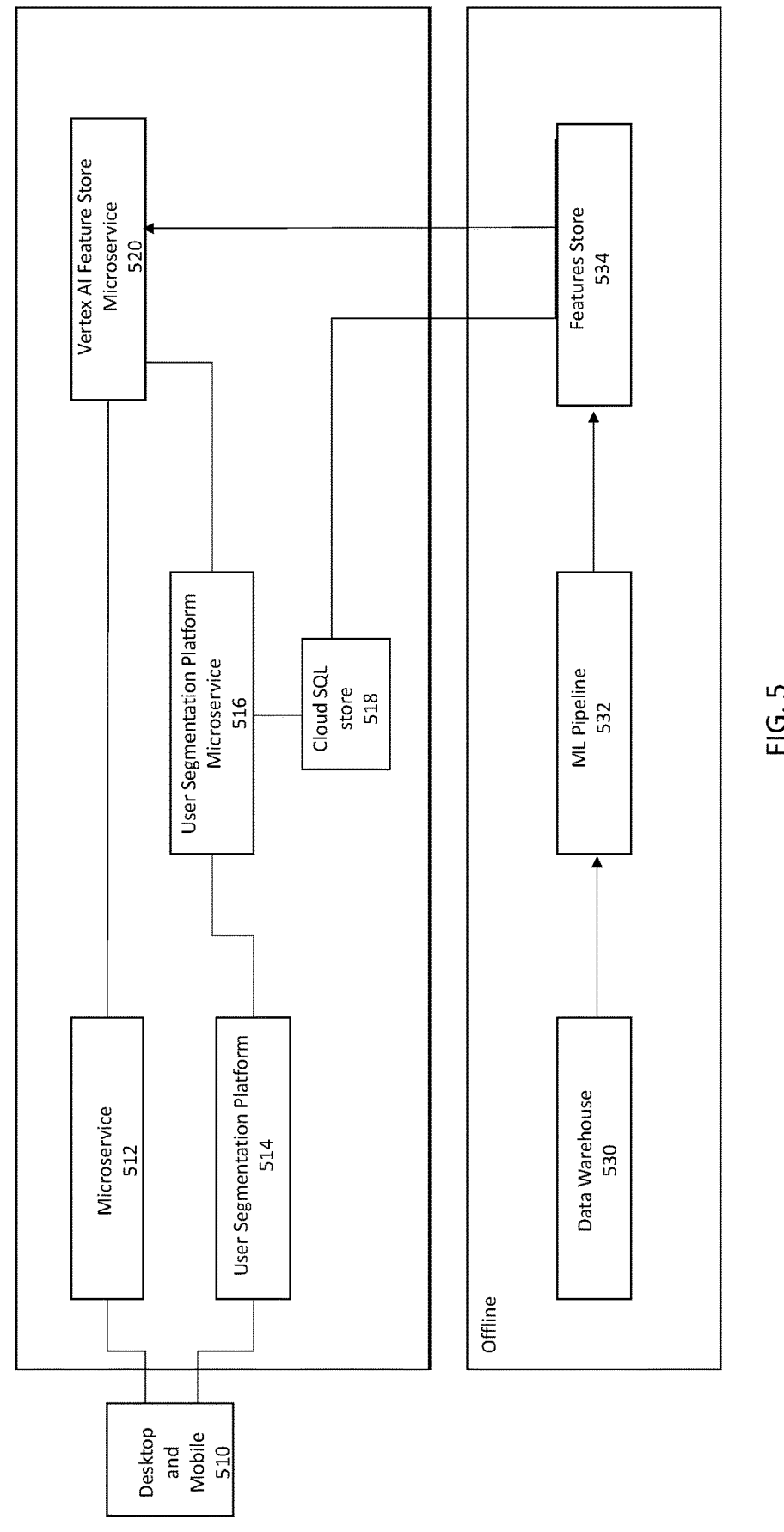
FIG. 5 illustrates a diagram of the architecture of the e-commerce site platform, according to some embodiments.

FIG. 5 illustrates a diagram of the architecture 500 of the e-commerce site platform, according to some embodiments. In some embodiments, the architecture 500 can include the data warehouse 530, the vertex artificial intelligence (AI)

feature store microservice 520, and the cloud SQL store 518. The architecture 500 may be, for example, in the cloud.

A user may use a desktop or mobile phone 510 to access the e-commerce site 104. Within the e-commerce site 104, a mircoservice 512 and the USP 214 exist in the backend. The microservice 512 may, for example, provide a managed environment for deploying, managing, and scaling containerized applications. Multiple machines may be grouped together to form a cluster within the microservice 512. The USP 214 was described above.

The microservice 512 may feed the listings, as described in step 410 into a vertex artificial intelligence (AI) feature store microservice 520. According to some embodiments, the vertex AI feature store microservice 520 uses cloud based ML models to generate a recommendation, as described in step 420. Feature data of the listings may be uploaded to the vertex AI feature store microservice 520 for online serving. The vertex AI feature store microservice 520 may provide a remote procedure call (RPC) application programming interface (API) framework to allow users to retrieve segment membership or any other relevant feature.

The USP 214 may feed the listings into a USP microservice 516. This USP microservice 516 may provide a managed environment, similar to the microservice 512. The USP microservice 516 may feed the listings into the cloud structure query language (SQL) store 518. The cloud SQL store 518 is used to manage configurations and feature sets and mappings. The USP 214 may have the capability to generate ad-hoc segments starting with a seed list of user IDs. Previously, the user search feature embeddings was used. An average embedding is generated for the seed users, which is followed by a nearest neighbor mapping for the rest of the candidate set, either all users or some subset of the users thereof.

The data warehouse 530 is where the feature data of the listings and user segments are generated offline. For example, the data warehouse 530 may be a fully-managed, serverless data warehouse 530 that enables scalable analysis over large amounts of data. The data warehouse 530 has built-in ML capabilities.

The data warehouse 530 may feed the feature data of the listings into a ML pipeline 532. The ML pipeline may then feed recommendations generated from the ML model into the features store 534.

The features store 534 contains several types of features of the listings. Segments may be created by specifying value ranges for features. For example, the global recency frequency monetary value (RFM) seller scores may be used to create a segment of top sellers. The top sellers, for example, have a value of 111. Additionally, a segment of churned valuables with a buyer RFM score of 411 may be provided. The score may be calculated by an input. In some implementations, the input can include a user ID associated with a user. The corresponding output may be how much that user is worth to the e-commerce site over a specified time period.

Additionally, psychographic and demographic data may be used. Using a data match, external segment definitions may be imported into the USP 214. These segments may be expanded to include the unmapped users via lookalike modeling.

Pricing Preferences 216

Casual or infrequent sellers do not have an accurate estimation of market value for items in their possession. Data suggests that price setting is often influenced by a number of factors including: emotional and/or familial attachments or memories associated with an item, the amount of time they believe they have owned the item, the estimation of the amount of use the item has undergone, and the recollection of how much they paid for the item. All of these factors are subjective and based on recall, which is often not accurate. Taken together, causal sellers often overprice their item when listing. Hence, the e-commerce site may aggregate market rate data to inform pricing that may drive an efficient and satisfactory sale.

Pricing preferences 216 may also be referred to as smart pricing. ML may be used to create optimal price preferences for users. This allows for modeling sellers and produce signals in the e-commerce site that may induce more selling and listing.

Figure 6:
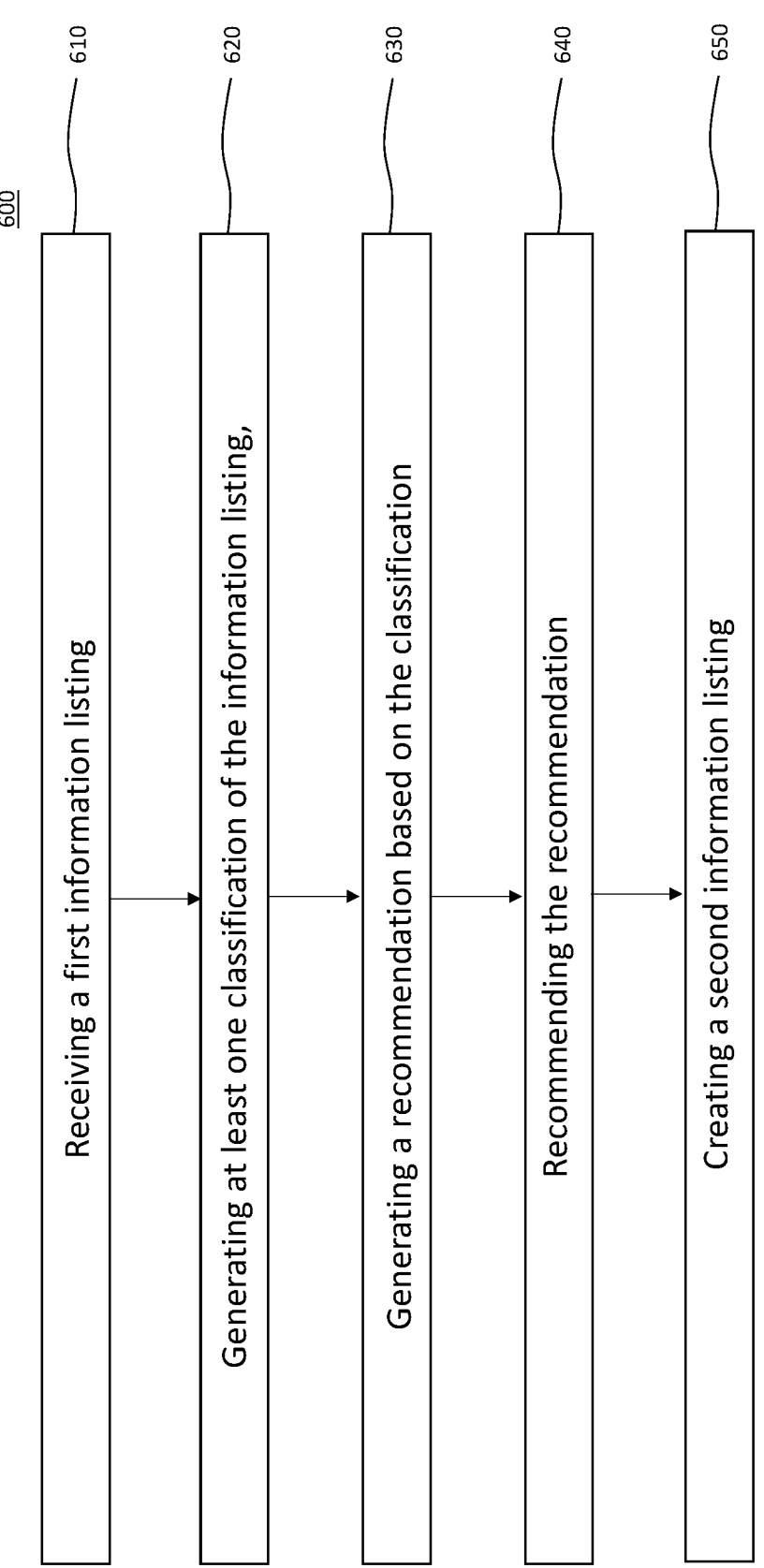
FIG. 6 illustrates a method of modelling seller profiles and behaviors, according to some embodiments.

FIG. 6 illustrates a method 600 of modelling seller profiles and behaviors, according to some embodiments. As a convenience and not a limitation, FIG. 6 may be described with regard to elements of FIGS. 1-5. Method 600 may represent the operation of Modelling seller profiles and behaviors implementing the ML module, which is a part of the sellability module 119. Method 600 may also be performed by computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

In 610, a first information listing may be received, via at least one computer processor. For example, the first information listing may be received on the e-commerce site from a seller. The first information listing may include a FSO, as described above.

In 620, at least one classification of the first information listing may be generated, via the at least one computer processor performing at least one machine-learning (ML) process based at least in part on at least one ML model and the first information listing. The classification may, for example, refer to the brand or category of the first information listing.

In 630, a recommendation based on the classification of the first information listing may be generated via the one computer processor. The recommendation may be based on the classification, such as the brand or category of the first information listing. The recommendation may, for example, be to generate a new listing of a new FSO or add a new FSO to the first information listing within the e-commerce site. According to some embodiments, the recommendation can include information associated with the new FSO. The information associated with the new FSO can include, but is not limited to, physical information associated with the new FSO, manufacturing information associated with the new FSO, price information associated with the new FSO, sellability information associated with the new FSO, or the like.

In 640, the recommendation may be recommended, via the one computer processor. Specifically, the recommendation may be, for example, recommended to the seller. The recommendation may be sent via email, within the e-commerce site app, SMS, push notification, or the like to the seller.

In 650, a second information listing may be created. For example, the second information listing may be created within the e-commerce site by the seller. According to some embodiments, the second information listing is created based on the recommendation. For example, the seller can use the recommendation to generate second information listing. Additionally, or alternatively, computing environment 100 can use the recommendation to generate the second information listing. The second information listing may include a different FSO that is complementary to the first information listing. complementary items may refer to items that are similar in nature, for example by brand or category. By recommending a recommendation to the seller, listings within the e-commerce site may increase, providing more FSOs for potential buyers.

Example Computer System

Figure 7:
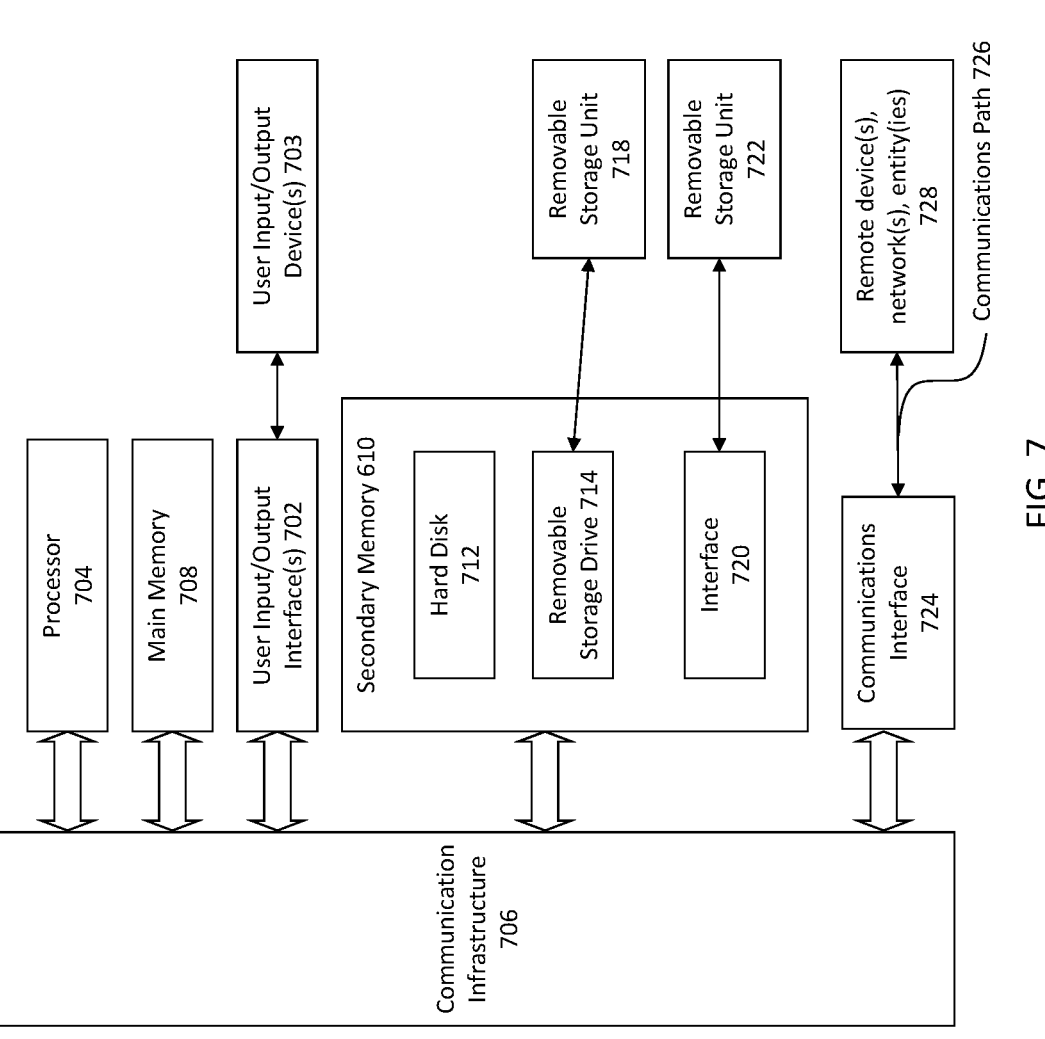
FIG. 7 illustrates an example computer system that can be used for implementing various embodiments.

Various embodiments may be implemented, for example, using one or more well-known computer systems, such as computer system 700 shown in FIG. 7. For example, the e-commerce site 104 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for enhancing listings in an e-commerce site, the computer-implemented method comprising:

receiving, via at least one computer processor, a first information listing;

receiving, via the at least one computer processor, at least one predictive feature data of the first information listing from a data warehouse;

generating at least one recommendation for a second information listing via the at least one computer processor performing at least one machine-learning (ML)

process based at least in part on at least one ML model and the at least one predictive feature data of the first information listing;

caching, via the at least one computer processor, the at least one recommendation in an online cloud database;

transmitting, via the at least one computer processor, a notification comprising the at least one recommendation;

redirecting, upon receiving an input indicating an interaction with the notification, to a web page displaying the at least one recommendation, wherein the displaying provides online access of the at least one recommendation from the online cloud database; and subsequent to the redirecting, creating the second information listing.

2. The computer-implemented method of claim 1, wherein the at least one predictive feature data comprises a brand or a category.

3. The computer-implemented method of claim 1, wherein the second information listing is complementary to the first information listing based on the at least one recommendation.

4. The computer-implemented method of claim 1, wherein the at least one recommendation occurs in a predetermined amount of time.

5. The computer-implemented method of claim 1, wherein the at least one recommendation comprises outputs of the at least one ML model.

6. The computer-implemented method of claim 5, wherein the outputs of the at least one ML model comprise predictive features, wherein the predictive features comprise at least one of a lifetime value, a churn score, or communication.

7. The computer-implemented method of claim 5, wherein the outputs of the at least one ML model comprise factual features, wherein the factual features comprise at least one of total gross merchandise value (GMV), days since last purchase, or days since last listing.

8. A non-transitory computer readable storage medium storing instructions that, when executed by at least one computer processor, cause the at least one computer processor to perform operations comprising:

receiving a first information listing;

receiving at least one predictive feature data of the first information listing from a data warehouse;

generating at least one recommendation for a second information listing by performing at least one machine-learning (ML) process based at least in part on at least one ML model and the at least one predictive feature data of the first information listing;

caching the at least one recommendation in an online cloud database;

transmitting a notification comprising the at least one recommendation;

redirecting, upon receiving an input indicating an interaction with the notification, to a web page displaying the at least one recommendation, wherein the displaying provides online access of the at least one recommendation from the online cloud database; and subsequent to the redirecting, creating the second information listing.

9. The non-transitory computer readable storage medium of claim 8, wherein the at least one predictive feature data comprises a brand or a category.

10. The non-transitory computer readable storage medium of claim 8, wherein the second information listing is complementary to the first information listing based on the at least one recommendation.

11. The non-transitory computer readable storage medium of claim 8, wherein the at least one recommendation occurs in a predetermined amount of time.

12. The non-transitory computer readable storage medium of claim 8, wherein the at least one recommendation comprises outputs of the at least one ML model.

13. The non-transitory computer readable storage medium of claim 12, wherein the outputs of the at least one ML model comprise predictive features, wherein the predictive features comprise at least one of a lifetime value, a churn score, or communication.

14. The non-transitory computer readable storage medium of claim 12, wherein the outputs of the at least one ML model comprise factual features, wherein the factual features comprises at least one of total gross merchandise value (GMV), days since last purchase, or days since last listing.

15. A system, comprising:

a memory; and at least one computer processor coupled to the memory and configured to perform operations comprising:

receiving a first information listing;

receiving at least one predictive feature data of the first information listing from a data warehouse;

generating at least one recommendation for a second information listing by performing at least one machine-learning (ML) process based at least in part on at least one ML model and the at least one predictive feature data of the first information listing;

caching the at least one recommendation in an online cloud database;

transmitting a notification comprising the at least one recommendation;

redirecting, upon receiving an input indicating an interaction with the notification, to a web page displaying the at least one recommendation, wherein the displaying provides online access of the at least one recommendation from the online cloud database; and subsequent to the redirecting, creating the second information listing.

16. The system of claim 15, wherein the at least one predictive feature data comprises a brand or a category.

17. The system of claim 15, wherein the second information listing is complementary to the first information listing based on the at least one recommendation.

18. The system of claim 15, wherein the at least one recommendation occurs in a predetermined amount of time.

19. The system of claim 15, wherein the at least one recommendation comprises outputs of the at least one ML model.

20. The system of claim 19, wherein the outputs of the at least one ML model comprise predictive features, wherein the predictive features comprise at least one of a lifetime value, a churn score, or communication.

* * * * *